United States Patent [19]
Justus et al.

[11] Patent Number: 5,568,496
[45] Date of Patent: Oct. 22, 1996

[54] LASER OPTICS PROTECTIVE DEVICE

[75] Inventors: Brian L. Justus; Alan L. Huston; Anthony J. Campillo, all of Springfield; Charles D. Merritt, Burke, all of Va.

[73] Assignee: The United States of America as represented by the Secretary of the Navy, Washington, D.C.

[21] Appl. No.: 351,070

[22] Filed: Nov. 30, 1994

[51] Int. Cl.$^6$ .................................................. H01S 3/10
[52] U.S. Cl. ........................... 372/11; 372/703; 359/227; 359/886
[58] Field of Search ................ 372/11, 703; 350/347 V, 350/354; 330/4.3; 359/886, 738, 227, 236

[56] References Cited

U.S. PATENT DOCUMENTS

| | | | |
|---|---|---|---|
| 3,832,649 | 8/1974 | Feichtner | 372/11 |
| 4,762,399 | 8/1988 | Wu | 350/347 V |
| 4,776,677 | 10/1988 | Park et al. | 350/354 |
| 4,890,075 | 12/1989 | Pohlmann et al. | 330/4.3 |
| 5,018,842 | 5/1991 | Chen | 350/354 |
| 5,208,698 | 5/1993 | Muller | 359/299 |
| 5,280,169 | 1/1994 | Honey et al. | 250/216 |
| 5,317,454 | 5/1994 | Sharp et al. | 359/886 |

OTHER PUBLICATIONS

U.S. patent application Ser. No. 08/251,146 B. L. Justus et al.

*Primary Examiner*—Rodney B. Bovernick
*Assistant Examiner*—Yisun Song
*Attorney, Agent, or Firm*—Thomas E. McDonnell; George Jameson

[57] ABSTRACT

A broadband thermal optical limiter disposed between a laser oscillator and a laser amplifier system for protecting optical components in the laser oscillator from damage due to amplified optical feedback from the laser amplifier system at all near ultraviolet, visible and near infrared wavelengths is disclosed. The thermal optical limiter comprises: a first lens for focusing the amplified optical feedback to a focal point on an optical axis; a flowing dye cell disposed near the focal point and being responsive to the focused amplified optical feedback for thermally defocusing and aberrating the focused amplified optical feedback into a plurality of rings about the optical axis; a second lens for passing only a small portion of the defocused amplified optical feedback; and a blocking aperture disposed around the second lens for blocking substantially all of the thermally defocused amplified optical feedback from the flowing dye cell and passing therethrough into the second lens only a small portion of the thermally defocused amplified optical feedback from the flowing dye cell.

17 Claims, 4 Drawing Sheets

BACKWARD DIRECTED LIGHT
BEAM PROFILE AT BLOCKING
APERTURE 27 IF NO LIMITING
OCCURS

STRONGLY
ABERRATED
RINGS OF
BACKWARD
DIRECTED LIGHT
BLOCKED
BY BLOCKING
APERTURE 27

STRONGLY
ATTENUATED
BACKWARD
DIRECTED LIGHT
45

BEAM PROFILE OF ABERRATED
BACKWARD DIRECTED LIGHT AT
BLOCKING APERTURE 27

LASER OPTICS PROTECTIVE DEVICE

CROSS-REFERENCE TO RELATED APPLICATION

This application is related to commonly assigned, U.S. application Ser. No. 08/251,146, pending, filed on May 31, 1994 now U.S. Pat. No. 5,491,579 by Brian L. Justus, Alan L. Huston and Anthony J. Campillo and entitled "Broadband Thermal Optical Limiter For The Protection Of Eyes And Sensors" which is incorporated herein by reference.

BACKGROUND OF THE INVENTION

1. Field of the Invention

The present invention relates to optical limiters and particularly to a passive optical limiter that protects optical components in a laser oscillator from optical damage as a result of amplified optical feedback.

2. Description of the Related Art

Amplified optical feedback can cause serious damage to optical components in laser systems. To avoid feedback, many high-power laser systems incorporate optical isolators. Optical isolators often consist of a pair of polarizers and a magneto-optic material that rotates the polarization of the light so that backward directed light can not return along the same path from which it came. The polarizers and the magneto-optic material are optimized for a single wavelength, and are generally not tunable over a large range of wavelengths. Optical isolators can be quite expensive, ranging from about $1,500 to more than $10,000.

Because of the inability of the optical isolators to operate over a wide range of wavelengths, they are generally not useful for broadly tunable lasers, such as Titanium:Sapphire, Optical Parametric Oscillator/Amplifier systems, Dye lasers, or any broadly tunable, amplified laser system.

SUMMARY OF THE INVENTION

It is therefore an object of the invention to provide an improved optical limiter.

Another object of the invention is to provide a device for protecting the optical components of a laser from amplified backward-directed light.

Another object of the invention is to provide a device for protecting the optical components of a laser from amplified backward-directed light from a following laser amplifier system by using a refractive thermal nonlinear optical mechanism interposed therebetween.

Another object of the invention is to provide a thermal optical limiter which contains an absorbing material dissolved in a solvent for thermally defocusing substantially all backward-directed light from a following laser amplifier system.

Another object of the invention is to provide an optical limiter apparatus having an optical limiter which contains a solution of nigrosin dissolved in carbon disulfide.

Another object of the invention is to provide a thermal optical limiter disposed between a laser oscillator and a laser amplifier system wherein the thermal optical limiter contains a flowing dye cell to circulate a broadband absorbing dye in a thermally refractive solvent to protect the laser oscillator from damage due to backward-directed light from the laser amplifier system.

Another object of the invention is to provide an optical limiter for protecting optical components in a laser from damage due to amplified optical feedback from a following laser amplifier system.

Another object of the invention is to protect optical components in a laser oscillator from damage due to amplified optical feedback from a following laser amplifier system at all near ultraviolet, visible and near infrared wavelengths.

A further object of the invention is to provide a flowing dye cell in a thermal optical limiter disposed between a laser oscillator and a laser amplifier system to protect optical components in the laser oscillator from damage due to backward-directed light from the laser amplifier system.

These and other objects of the invention are achieved by providing a broadband thermal optical limiter disposed between a laser oscillator and a laser amplifier system for protecting optical components in the laser oscillator from damage due to amplified optical feedback from the laser amplifier system at all near ultraviolet (UV), visible, near infrared, and infrared (IR) wavelengths. The thermal optical limiter is comprised of a flowing dye cell disposed between a first lens and a second lens. The flowing dye cell contains an absorbing dye in a circulating thermally refractive solvent. In operation, a low intensity light beam from the laser oscillator passes through the thermal optical limiter with no distortion of the beam shape and only a small attenuation due to absorption by the dye solution. However, if high intensity light is fed back from the laser amplifier system, the dye solution at or near the focal point of the focusing lens is significantly heated, creating a negative thermal lens which defocuses and highly aberrates the backward-directed high intensity light from the laser amplifier system. As a result, most of the energy in this backward-directed light is distributed into a series of rings about the optical axis of this backward-directed light and effectively stopped by a blocking aperture disposed around the first lens from reaching and damaging the laser oscillator.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
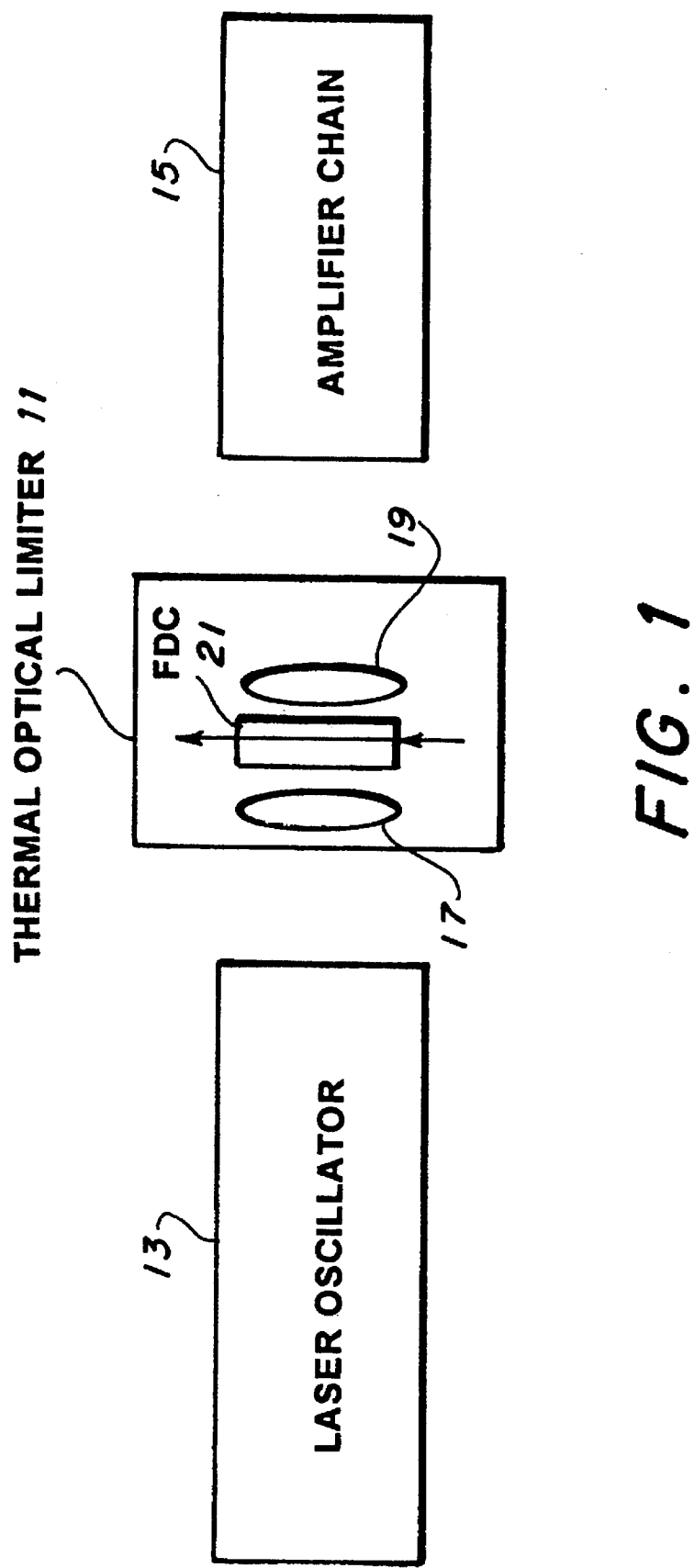
FIG. 1 illustrates a schematic block diagram of the thermal optical limiter apparatus of the invention placed between a laser oscillator and a laser amplifier chain.

Referring now to the drawings, FIG. 1 illustrates a schematic block diagram of [a low f/number defocusing] thermal optical limiter apparatus 11 of the invention placed between a laser oscillator or laser 13 and a laser amplifier chain 15. The laser amplifier chain 15 can comprise a single laser amplifier or a sequence of cascaded laser amplifiers for amplifying low intensity light from the laser oscillator 13 to a higher energy level. Such amplification is needed, for example, in applications where the laser 13 produces a laser pulse output which, in order to be useful, must be amplified to a much higher light energy level. One problem that may arise from such light amplification is that some of the amplified light energy from the amplifier chain 15 could be accidentally reflected or directed back into the laser oscillator 13 and damage the mirrors (not shown), laser medium (not shown), lenses (not shown) or any other optical components (not shown) in the laser oscillator 13.

The broadband thermal optical limiter 11 of the invention provides protection to the laser oscillator 13 from backward-directed light from the laser amplifier chain 15 by limiting the amplified backward-directed light energy or optical feedback that can be returned to the laser oscillator 13. Basically, the thermal optical limiter 11 of FIG. 1 consists of an optical or lens system comprised of lenses 17 and 19 that operate together to focus and recollimate the light from the laser oscillator 13, and a flowing dye cell (FDC) 21 that contains a broadband absorbing dye in a thermally refractive solvent. The lenses 17 and 19 also operate together to focus the backward directed light from the amplifier chain 15 into the flowing dye cell 21 and pass very little light directed back from the amplifier chain 15 back toward the laser oscillator 13.

For optimal optical limiting, the optical system (17 and 19) of the limiter 11 should be f/5 or less for backward-directed light and greater than f/5 for light from the laser oscillator 13 (where f/number refers to the ratio of the focal length of a lens (17 or 19) and the diameter of the light beam). However different f/number optics can be used depending on the desired temporal response. Because most laser oscillators operate at repetition rates of more than one Hertz, it is essential to flow the broadband absorbing dye in the thermally refractive solvent through the irradiated region to avoid photochemical and thermal degradation. The absorption of the dye can be set over a broad range of values depending on the specific application. However, a transmission of between 50% and 90% is optimal.

The lenses 17 and 19, as well as the operation of the broadband thermal optical limiter 11 of FIG. 1, will be explained in greater detail by now referring to both FIGS. 1 and 2.

Lenses 17 and 19 are preferably identical in structure and function and in combination form a lens system in the thermal optical limiter 11. Each of the lenses 17 and 19 is positioned on an opposite side of the flowing dye cell 21, has substantially the same focal length as the other lens and has substantially the same focal point 22 in the flowing dye cell 21 along an axis 25 that passes through the cell 21. Thus, the distance between them is selected to be substantially twice the focal length of either of the lenses 17 and 19. An exemplary optical system can consist of a pair of 5 centimeter focal length lenses such that lens 17 has an effective f/number of 25 by choosing a 0.2 centimeter diameter blocking aperture 27, a 1 centimeter diameter blocking aperture 20, and an overall length of 10 centimeters. However, it should be realized that the specific types of lenses 17 and 19 that are selected and the specific diameters of the blocking apertures 20 and 27 depend on the particular laser oscillator 13 that is being utilized and the specific kind of absorbing material that is being used at the focal point 22.

In the operation of the broadband thermal optical limiter 11, low intensity light from laser oscillator 13 is focused by lens 17 to a focal point 22 in the flowing dye cell 21, and then passes through the flowing dye cell 21 to the lens 19 which operates to recollimate the light from the flowing dye cell 21. The low intensity light beam from the laser oscillator 13 passes through the lens 17, the flowing dye cell 21 and the lens 19 of the broadband thermal optical limiter 11 with no distortion of the beam shape and with only a small attenuation due to absorption by the broadband absorbing dye in the thermally refractive solvent in the flowing dye cell 21. The reason why the beam shape of the low intensity light beam is not distorted and the low intensity light beam is only slightly attenuated is because the intensity of the low intensity light beam is sufficiently low that the dye solution at the focus of the broadband thermal optical limiter 11 is not heated significantly and therefore no diffraction of the low intensity light beam occurs as the beam passes through the flowing dye cell 21. This is so because the f/number of the focusing lens 17 acting upon the light from the laser oscillator 13 is much higher than f/5 and the resulting focal spot size is large. As a result only a small amount of light passing through the dye solution is attenuated.

The recollimated light from the lens 19 passes into the laser amplifier chain 15 and is amplified accordingly. The amplifier chain 15 can be comprised of a single laser amplifier (not shown) or a plurality of cascaded amplifiers (not shown), depending on the requirements of the desired light intensity level. In some cases there may be an amplified optical feedback from the laser amplifier chain 15. The feedback may be the result of amplified spontaneous emission (ASE) from a single amplifier (or multiple amplifier stages) in the laser amplifier chain 15 or it may result from reflections directed unintentionally back through the amplifier stage(s) in the laser amplifier chain 15 due to operator error or negligence.

When the amplified optical feedback, or a high intensity pulse of light is reflected or fed back, from the laser amplifier chain 15, a blocking aperture 20, which may be disposed around the lens 19, blocks any backward-directed light that cannot be collected by the lens 19. The remaining portion of the high-intensity, backward-directed light is focused by the lens 19 substantially back to the focal point 22 in the flowing dye cell 21 of the thermal optical limiter 11. This high intensity pulse of light causes the dye solution at or near the focal point 22 of the lens 19 in the flowing dye cell 21 to heat significantly, creating a negative thermal lens. As a result of the thermal lens, the backward-directed light from the laser amplifier chain 15 that emerges from the flowing dye cell 21 is defocussed and highly aberrated, with most of the energy distributed in a series of high-intensity, light diffraction rings 23 (such as 23A and 23B) around an optical axis 25. Most of the energy in this series of high-intensity, light diffraction rings 23 from the flowing dye cell 21 is substantially blocked by a blocking aperture 27 disposed around the lens 17 and, therefore, can not reach the laser oscillator 13 to cause damage to the optical components (not shown) in the laser oscillator 13. A small portion of the aberrated light from the flowing dye cell 21 is passed by the lens 17 and passes back toward the laser oscillator 13. However, this light passing through the lens 17 back toward the laser oscillator 13 has such a very low light intensity level that it does no damage to the optical components of the laser oscillator 13.

As stated before, because most lasers operate at repetition rates of more than one Hertz, it is essential to flow the dye through the irradiated region to avoid photochemical and thermal degradation to the dye in the thermally refractive solvent in the flowing dye cell 21. In this manner, a fresh solution of the broadband absorbing dye flows through the optical path of the laser oscillator 13 each time that the laser oscillator 13 emits a light pulse. One exemplary implementation for flowing broadband absorbing dye in a thermally refractive solvent is illustrated in FIG. 2, which will now be discussed.

In a closed loop flowing dye system 29 of FIG. 2, a pump 31 pumps a broadband absorbing dye in a thermally refractive solvent (hereinafter called an "absorbing dye solution") from a dye reservoir 33 through an inlet line 35 and an inlet port or valve 37 of the flowing dye cell 21 into the flowing dye cell 21. The absorbing dye solution in the flowing dye cell 21 then passes through an outlet port or valve 39 and through a return line 41 before returning to the dye reservoir 33. By the use of such a closed loop flowing dye system 29, there is always a fresh supply of broadband absorbing dye solution flowing through the flowing dye cell 21 when the laser oscillator is pulsed to transmit a pulse of light through the focal point 22 in the flowing dye cell 21. As a consequence, the flowing dye in the flowing dye cell 21 does not overheat and wear out as a result of high-intensity backward-directed light from the laser amplifier chain 15.

Figure 2:
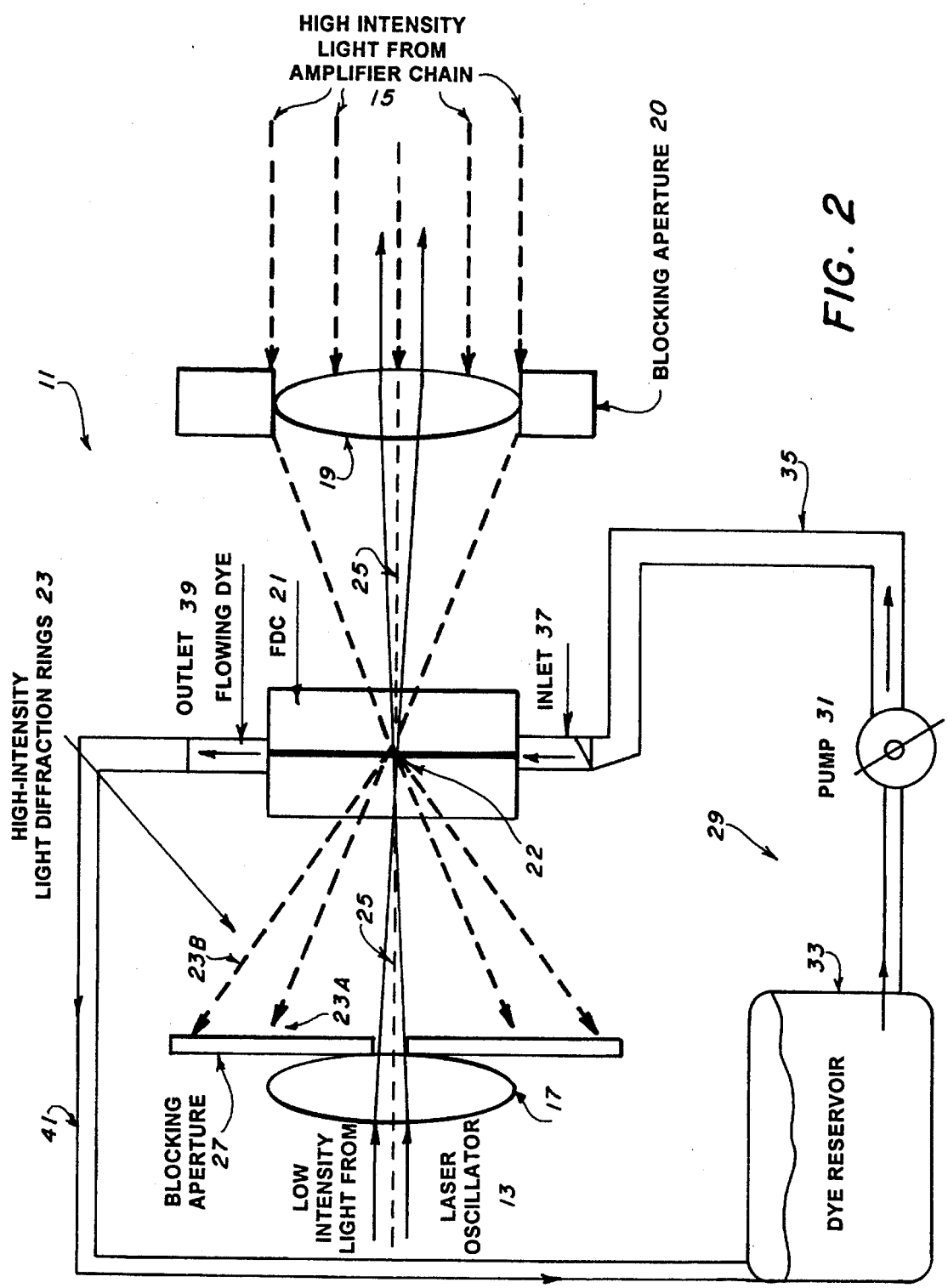
FIG. 2 illustrates in detail a schematic block diagram of the thermal optical limiter apparatus of FIG. 1.
Figure 3A:
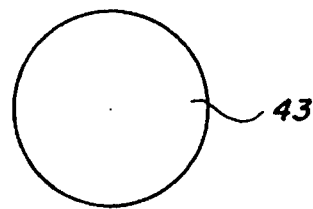
FIGS. 3A and 3B illustrate the optical limiting operation of the thermal optical limiter of FIGS. 1 and 2 in response to amplified backward-directed light from the laser amplifier chain of FIG. 1.
Figure 3B:
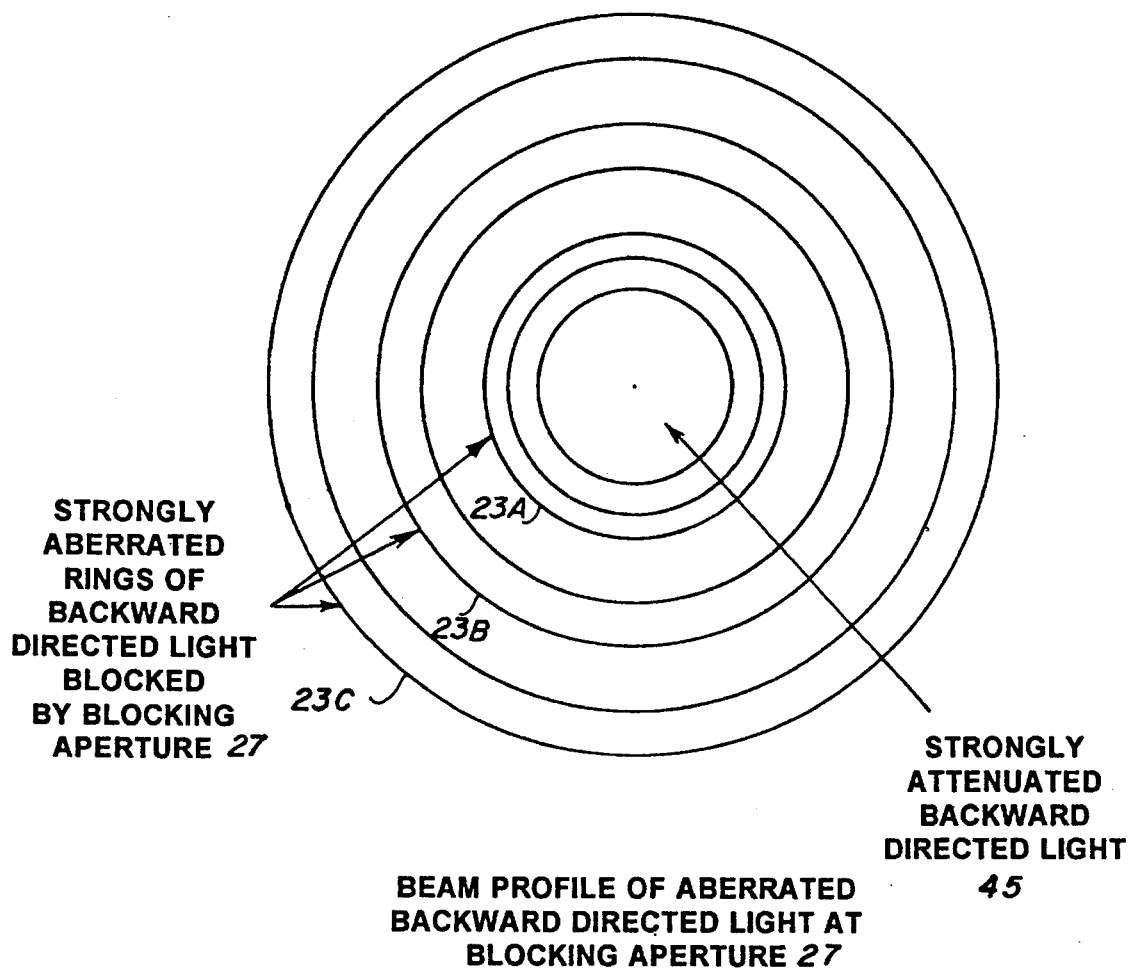

FIGS. 3A and 3B illustrate the optical limiting operation of the broadband thermal optical limiter of FIGS. 1 and 2 in response to the high-intensity, backward-directed light beam from the laser amplifier chain 15. FIG. 3A shows the profile of the high-intensity, backward-directed light beam 43 from the laser amplifier chain 15 as it would appear at blocking aperture 27 if there was no absorbing dye in the thermal solvent and no limiting occurs. FIG. 3B shows the profile of the light beam 43 at the blocking aperture 27 after it has been defocused by the broadband absorbing dye solution flowing through the flowing dye cell 21 into an exemplary series of concentric strongly aberrated rings 23A, 23B and 23C of light. The blocking aperture 27 blocks these strongly aberrated rings 23A, 23B and 23C of light, while allowing only the strongly attenuated light 45 (that remains from the backward-directed light beam 43) to be passed by the lens 17 into the laser oscillator 13.

Optical limiting of the thermal optical limiter apparatus 11 (of FIGS. 1 and 2) was demonstrated using solutions of an organic dye, nigrosin, dissolved in a thermal solvent, such as preferably carbon disulfide ($CS_2$), which possess excellent refractive thermal nonlinearities. Other thermal solvents that may be used are carbon tetrachloride ($CCl_4$), methanol (MeOH) and chloroform ($CHCl_3$). The nigrosin is an absorber which simply acts to absorb light to heat up and then transfer that heat to the thermal solvent in which the nigrosin was dissolved.

A thermal solvent can be defined as any substance (solid, liquid or gas) that exhibits a change in index of refraction upon heating. An absorber can be defined as any substance or material that absorbs electromagnetic energy and transforms that energy into thermal energy in a surrounding medium.

A water soluble form of nigrosin was used in this work. Nigrosin (which is supplied by the Aldrich Chemical Co., Milwaukee, Wis.) is characterized by an extremely broad and flat absorption over the entire visible and near IR spectral regions.

The use of a broadband absorbing dye such as nigrosin enables the passive, broadband, thermal optical limiter of the invention to be used with broadly tunable, pulsed lasers as well as with single wavelength lasers. Almost any liquid except water will work for the dye solvent, but liquids with high thermal figures of merit will optimize the operation of the device. The optics (lenses 17 and 19) in the thermal optical limiter 11 can be broadband antireflection coated (not shown) to reduce back-reflections and transmission reflection losses. The optical attenuation of the flowing dye solution can be monitored using a light emitting diode (not shown) and a pair of photodiodes (not shown). In this way, if the flowing dye degrades to a predefined level, the operator of the laser oscillator 13 can be notified that the flowing dye needs to be changed.

Figure 4:
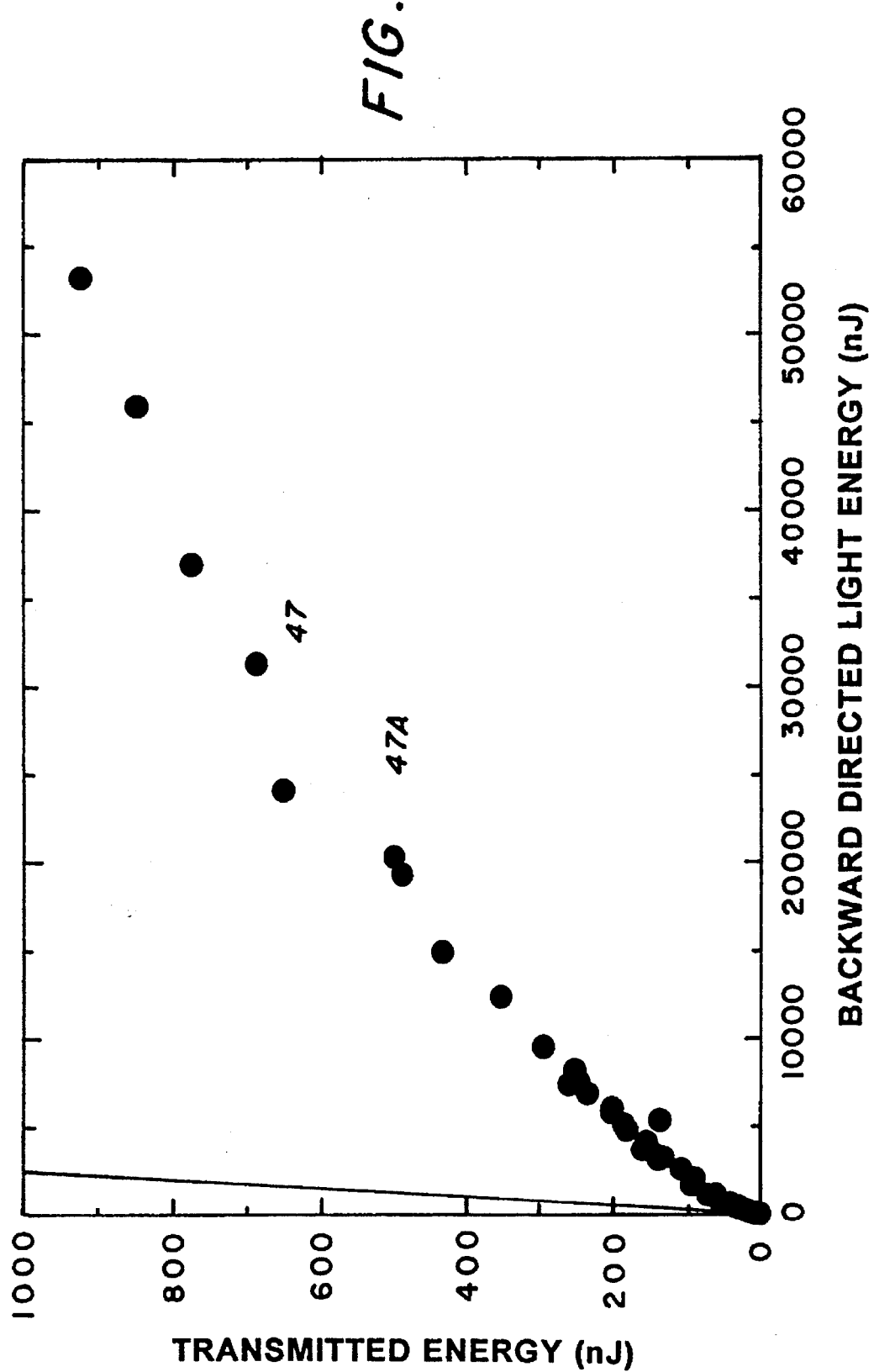
FIG. 4 shows the limiting data of the thermal limiter of the invention using a linear absorbing material, nigrosin, dissolved in carbon disulfide.

FIG. 4 illustrates the performance curve 47 of a thermal optical limiter. The solid circles 47A in the performance curve 47 represent data for a solution of nigrosin in carbon disulfide ($CS_2$). The optical absorption of the nigrosin solution was 50%. The data was obtained using f/5 optics and the blocking aperture 27 was set to transmit 100% of the low intensity light. The performance of the laser optics protective device of this invention (the thermal optical limiter 11) would be substantially improved since the blocking aperture 27 could be set much smaller, as indicated in FIG. 2.

ADVANTAGES AND NEW FEATURES OF THE INVENTION

The main advantage of the broadband, thermal optical limiter over the prior art is that it will provide protection to the laser oscillator 13 over a wide range of wavelengths. The cost of this thermal optical limiter (about $500) is significantly less that of optical isolators. This thermal optical limiter can be used in environments where magnetic fields must be avoided. In addition, the thermal optical limiter can be very compact, requiring an exemplary length of approximately ten (10) centimeters (cm) for most applications. Because of its small size and the fact that it does not distort the low intensity beam profile, this thermal optical limiter can be retrofitted into many existing laser systems.

Therefore, what has been described in a preferred embodiment of the invention is a broadband thermal optical limiter disposed between a laser oscillator and a laser amplifier system for protecting optical components in the laser oscillator from damage due to amplified optical feedback from the laser amplifier system at all near ultraviolet, visible and near infrared wavelengths. The thermal optical limiter of the invention is comprised of a flowing dye cell disposed between a lens system comprised of two lenses which cooperate to sequentially focus and collimate light inputted thereto from either direction. The flowing dye cell contains an absorbing dye in a circulating thermally refractive solvent. In operation, a low intensity light beam from the laser oscillator passes through the thermal optical limiter with no distortion of the beam shape and only a small attenuation due to absorption by the dye solution. However, if high intensity light is fed back from the laser amplifier system, the dye solution at or near the focal point of the focusing lens is significantly heated, creating a negative thermal lens which defocuses and highly aberrates the backward-directed high intensity light from the laser amplifier system. As a result, most of the energy in this backward-directed light is distributed in a series of rings about the optical axis of this backward-directed light and effectively stopped by a collecting or blocking aperture disposed around the collimating lens from reaching and damaging the laser oscillator.

It should therefore readily be understood that many modifications and variations of the present invention are possible within the purview of the claimed invention. For example, the thermal optical limiter of the invention will work with any absorbing material or dye that releases heat, following excitation by a high-intensity, backward-directed light beam, into the thermally refractive solvent into which the absorbing material is dissolved. This fact suggests that dyes that do not fluoresce are preferred over fluorescent dyes. Absorbers that are termed "reverse saturable absorbers (RSA's)" can also be used, such as Fullerenes, $C_{60}$ and $C_{70}$, and the entire class of Phthalocyanine dyes. In addition, use of a nonlinear scattering mechanism in conjunction with the thermal refractive mechanism may improve the performance of the invention. The thermal optical limiter of the invention provides protection for both tunable and single wavelength pulsed wavelengths. It is therefore to be understood that, within the scope of the appended claims, the invention may be practiced otherwise than as specifically described.

What is claimed and desired to be secured by Letters Patent of the United States is:

1. A passive, broadband, thermal optical limiter disposed between a laser oscillator and a laser amplifier system for providing protection for optical components in the laser oscillator from damage due to amplified optical feedback from the laser amplifier system, said broadband thermal optical limiter comprising:

first optical means for focusing the amplified optical feedback to a focal point;

a flowing dye cell disposed near the focal point, said flowing dye cell being responsive to the focused amplified optical feedback for defocusing and highly aberrating said focused amplified optical feedback into a plurality of rings about an optical axis;

second optical means for passing only a small portion of the aberrated optical feedback optical means; and a blocking aperture disposed around said second optical means for substantially blocking all of the aberrated optical feedback deflected by said flowing dye cell and for passing therethrough into said second optical means only a small portion of the aberrated optical feedback from said flowing dye cell.

2. The thermal optical limiter of claim 1 wherein said flowing dye cell comprises:

a cell; and means for flowing a solution comprised of a broadband absorbing dye dissolved in a thermally refractive solvent through said cell.

3. The thermal optical limiter of claim 2 wherein:

said cell contains inlet and outlet ports; and said flowing means comprises:

a reservoir of said solution;

a return line coupled between said reservoir and said outlet port for allowing said solution to flow from said cell to said reservoir;

an input line coupled between said reservoir and said inlet port; and a pump interposed in said input line for pumping said solution from said reservoir, through said input line, said cell and said return line back to said reservoir.

4. The thermal optical limiter of claim 2 wherein:

said broadband absorbing dye is responsive to the focused amplified optical feedback for transferring heat to said thermally refractive solvent; and said thermally refractive solvent being responsive to the heat transferred from said heated broadband absorbing dye for thermally defocusing and aberrating substantially all of said focused amplified optical feedback into a plurality of rings about the optical axis.

5. The thermal optical limiter of claim 2 wherein:

said solution comprised of a broadband absorbing dye is a solution of nigrosin; and said thermally refractive solvent is carbon disulfide.

6. The thermal optical limiter of claim 5 wherein:

said nigrosin has an extremely broad and flat absorption over the entire near ultraviolet, visible and near infrared spectral regions.

7. The thermal optical limiter of claim 5 wherein:

said nigrosin acts to absorb a portion of said focused amplified optical feedback and then transfer heat to said carbon disulfide solvent.

8. The thermal optical limiter of claim 1 wherein:

said first optical means operates as a focusing lens to focus said amplified optical feedback to a focal point in said flowing dye cell.

9. The thermal optical limiter of claim 1 wherein:

said second optical means operates as a lens to pass only the small portion of the aberrated optical feedback that is not blocked by said blocking aperture.

10. A broadband thermal optical limiter disposed between a laser oscillator and a laser amplifier system for protecting optical components in the laser oscillator from damage due to amplified optical feedback from the laser amplifier system at all near ultraviolet, visible and near infrared wavelengths, said thermal optical limiter comprising:

a first lens for focusing the amplified optical feedback to a focal point on an optical axis;

a flowing dye cell disposed near the focal point and being responsive to the focused amplified optical feedback for thermally defocusing substantially all of the focused amplified optical feedback into a plurality of rings about the optical axis;

a second lens for passing only a small portion of the defocused amplified optical feedback; and a blocking aperture disposed around said second lens for blocking substantially all of the thermally defocused amplified optical feedback from said flowing dye cell and passing therethrough into said second lens only a small portion of the thermally defocused amplified optical feedback from said flowing dye cell.

11. The thermal optical limiter of claim 10 wherein said flowing dye cell comprises:

a cell; and means for flowing a solution comprised of a broadband absorbing dye dissolved in a thermally refractive solvent through said cell.

12. The thermal optical limiter of claim 11 wherein:

said cell contains inlet and outlet ports; and said flowing means comprises:

a reservoir of said solution;

a return line coupled between said reservoir and said outlet port for allowing said solution to flow from said cell to said reservoir;

an input line coupled between said reservoir and said inlet port; and a pump interposed in said input line for pumping said solution from said reservoir, through said input line, said cell and said return line back to said reservoir.

13. The thermal optical limiter of claim 11 wherein:

said broadband absorbing dye is responsive to the focused amplified optical feedback for transferring heat to said thermally refractive solvent; and said thermally refractive solvent being responsive to the heat transferred from said heated broadband absorbing dye for thermally defocusing and aberrating substantially all of said focused amplified optical feedback into a plurality of rings about the optical axis.

14. The thermal optical limiter of claim 11 wherein:

said solution comprised of a broadband absorbing dye is a solution of nigrosin; and said thermally refractive solvent is carbon disulfide.

15. The thermal optical limiter of claim 14 wherein:

said nigrosin has an extremely broad and flat absorption over the entire near ultraviolet, visible and near infrared spectral regions.

16. The thermal optical limiter of claim 14 wherein:

said nigrosin acts to absorb a portion of said focused amplified optical feedback and then transfer heat to said carbon disulfide solvent.

17. A method for protecting optical components in a laser oscillator from optical damage due to amplified optical feedback from a following laser amplifier system through the use of a flowing dye cell interposed between the laser oscillator and the laser amplifier system, said method comprising the steps of:

focusing the amplified optical feedback from the laser amplifier system to a focal point in the flowing dye cell;

defocusing the amplified optical feedback in the flowing dye cell into a plurality of rings about an optical axis;

substantially blocking all of the defocused amplified optical feedback from the flowing dye cell; and passing only that portion of the defocused amplified optical feedback not blocked.

* * * * *